(12) United States Patent
Jang

(10) Patent No.: US 7,677,509 B2
(45) Date of Patent: Mar. 16, 2010

(54) MONITOR STAND

(75) Inventor: Woon Geun Jang, Daegoo-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/702,176

(22) Filed: Feb. 5, 2007

(65) Prior Publication Data

US 2007/0272809 A1 Nov. 29, 2007

(30) Foreign Application Priority Data

May 26, 2006 (KR) ..................... 10-2006-0047659

(51) Int. Cl.
*F16M 11/00* (2006.01)
(52) U.S. Cl. .................... 248/176.1; 248/121; 248/917; 248/919; 248/920; 248/921
(58) Field of Classification Search ........................ None
See application file for complete search history.

(56) References Cited

U.S. PATENT DOCUMENTS 7,061,753 B2 * 6/2006 Michoux et al. ............ 361/681
7,068,497 B2 * 6/2006 Chu ........................... 361/681
7,150,440 B2 * 12/2006 Yuan ....................... 248/372.1
2005/0035252 A1 * 2/2005 Chen ....................... 248/284.1
2006/0219849 A1 * 10/2006 Chiu ....................... 248/125.8
2007/0029457 A1 * 2/2007 Baek ....................... 248/372.1
2007/0152125 A1 * 7/2007 Lee ........................... 248/398

* cited by examiner

*Primary Examiner*—Amy J Sterling
(74) *Attorney, Agent, or Firm*—Birch, Stewart, Kolasch & Birch, LLP

(57) ABSTRACT

A monitor stand is provided and includes a base, a stand body, a stand top assembly, an upper hinge assembly, a top slide, a first elastic member, and a locking unit. The stand body is supported by the base. The stand top assembly is pivotably supported by the stand body. The upper hinge assembly is provided with a rotating shaft to pivotably connect the stand body to the stand top assembly. The top slide slides along the stand top assembly and has a monitor mounted thereon. The first elastic member is supported on the stand top assembly, to impart an upward elasticity to the top slide. The locking unit restricts a sliding of the top slide with respect to the stand top assembly, when the stand top assembly is pivoted from a vertical position to beyond a predetermined angle.

15 Claims, 7 Drawing Sheets

MONITOR STAND

BACKGROUND OF THE INVENTION

1. Field of the Invention

The present invention relates to a stand for supporting a monitor, and more particularly, to a monitor stand with tilt and height adjustment, and capable of preventing an "auto lift up" phenomenon that occurs when the monitor is tilted past a predetermined angle, due to a change in acting direction of the monitor's weight.

2. Description of the Related Art

Generally, flat panel monitors such as liquid crystal display devices (LCD) require stands for supporting the monitors on a desk or table for use. Such stands have a hinge assembly interposed between the rear of the monitor and the stand to allow a user to adjust the monitor to a desired angle.

Recently, monitor stands have been developed to adjust not only the tilt angle, but also the height of the monitor, for added convenience.

Referring to FIG. 1, a monitor stand according to the related art will be described in detail.

As shown in FIGS. 1 and 2, a monitor stand according to the related art includes a stand top 4 installed to raise and lower the monitor 1, a stand body 2 pivotably supporting the stand top 4, and a base 3 for supporting the stand body 2 on a desk or other flat surface.

When a user grasps the upper or lower portion of the monitor 1 and pulls it forward, the stand top 4 pivots about the upper hinge 5 to adjust the tilt angle of the monitor 1.

In order to support the monitor 1, a spiral spring (not shown) that provides an elastic force in an upward direction equal to the weight W of the monitor 1, is provided inside the stand top 4. The spiral spring provides a uniform elastic force F to support the monitor 1 in an upward direction, regardless of its deformed state.

Accordingly, after the user moves the monitor 1 upwards or downwards with respect to the stand 4 and releases the force applied to the monitor 1, the monitor 1 maintains its current position due to the tension of the spiral spring (not shown) and the friction between components. Height adjusting of the monitor 1 is thus accomplished.

The lower portion of the stand body 2 is pivotably coupled to the base 3 with a lower hinge 6 interposed therebetween.

However, as shown in FIG. 2, in the above configuration of a monitor stand according to the related art, when a user pivots the monitor 1 to the rear, and the tilt angle exceeds a predetermined angle (30° from a vertical line, for example), the weight W of the monitor 1 is divided, so that the equilibrium between the tension F of the spiral spring and component of force W1 in a sliding direction of the monitor 1 is lost.

That is, when the monitor 1 has pivoted by an angle $\theta$ with respect to a vertical line, the component of force W1 of the monitor weight W1 is $W \cos \theta$, and becomes less than the tension F of the coil spring, so that when the difference exceeds the friction between the components, an auto lift up of the monitor 1 occurs. Therefore, an adjustment of the monitor to the height desired by the user does not occur. In severe cases, auto lift up of the monitor may cause it to collide with another object, causing a user unpleasantness.

SUMMARY OF THE INVENTION

Accordingly, the present invention is directed to a monitor stand that substantially obviates one or more problems due to limitations and disadvantages of the related art.

An object of the present invention is to provide a monitor stand that effectively prevents the auto lift up phenomenon of the monitor from occurring when the acting direction of the weight of monitor is changed due to tilting of the monitor installed on a stand beyond a predetermined angle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a monitor stand including: a base; a stand body supported by the base; a stand top assembly pivotably supported by the stand body; an upper hinge assembly provided with a rotating shaft for pivotably connecting the stand body to the stand top assembly; a top slide for sliding along the stand top assembly and having a monitor mounted thereon; a first elastic member supported on the stand top assembly, for imparting an upward elasticity to the top slide; and a locking unit for restricting a sliding of the top slide with respect to the stand top assembly, when the stand top assembly is pivoted from a vertical position to beyond a predetermined angle.

The stand top assembly may include: a stand top forming a guide rail at each side thereof facing one another; and a stand top supporter pivotably supported by the stand body, for supporting the stand top.

The locking unit may include: a cam fixed to the rotating shaft; a cam follower contacting the cam at a lower portion thereof and capable of moving vertically according to a rotation of the cam, and guided nearer to or farther from the top slide according to the vertical movement thereof, the cam follower including a moving rack formed facing the top slide, and a fixed rack formed on the top slide facing the moving rack, for ceasing to rise when engaged to the moving rack.

The cam follower may include a guide pin protruding in a side direction, and the stand top may include a guide rib fixed thereon, and the guide rib may form a guide hole and the guide pin may rise and move closer to the top slide, for guiding and engaging the moving rack to the fixed rack.

The monitor stand may further include a second elastic member for imparting elasticity to the cam follower toward the cam.

The cam follower may include a cam roller installed at a bottom end thereof capable of rotating freely, for rolling along the cam.

The first elastic member may be a spiral spring that winds and unwinds according to a position of the top slide, and the second elastic member may be a coil spring with one end thereof fixed to the cam follower and another end thereof fixed to the stand top, the second elastic member installed in an expanded state.

The monitor stand may further include a lower hinge assembly for pivotably connecting the stand body to the base.

The monitor may be installed to the top slide with a head mount interposed therebetween.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
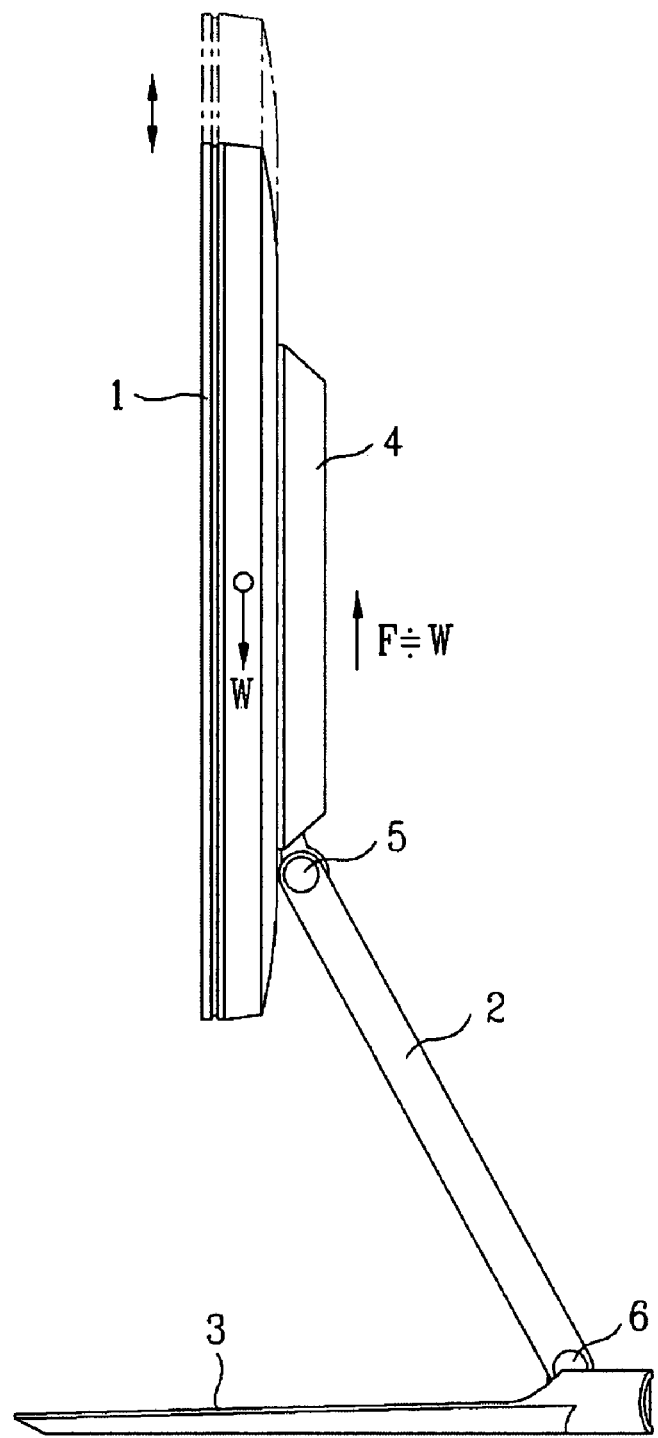
FIG. 1 is a schematic side view of a monitor stand according to the related art.
Figure 2:
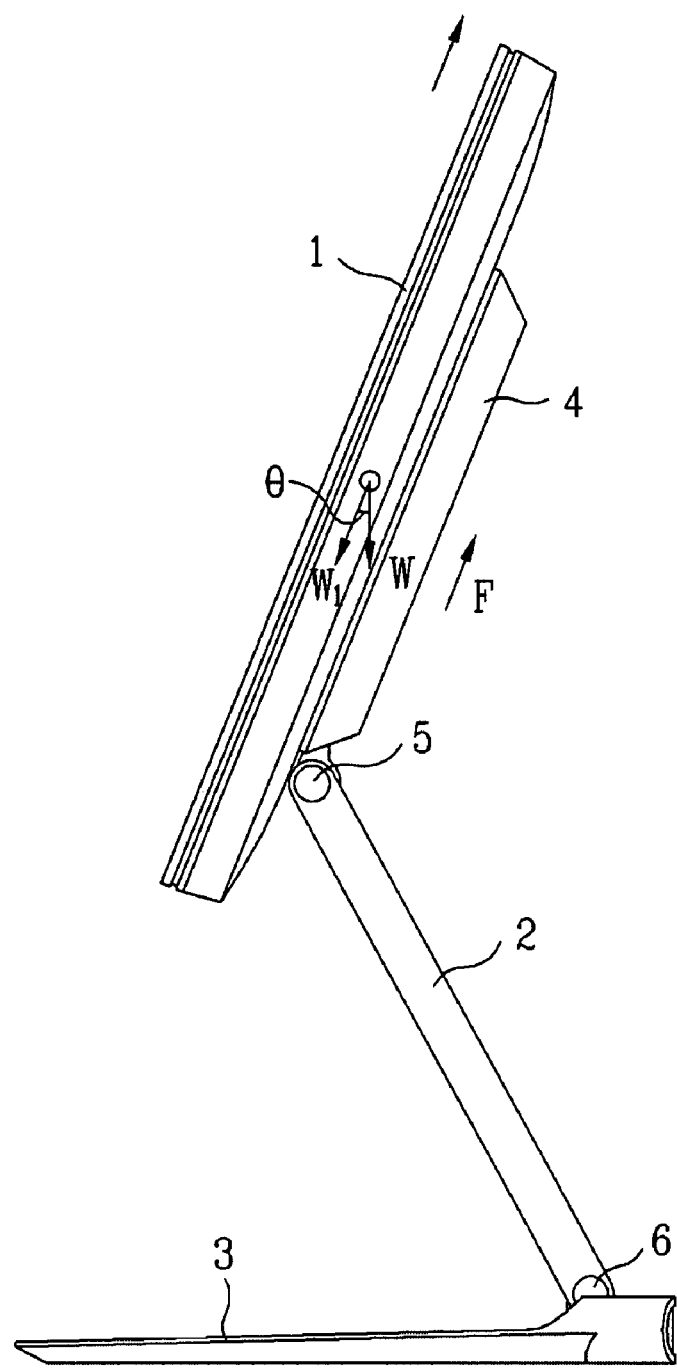
FIG. 2 is a side view of a monitor installed on a monitor stand according to the related art, showing the auto lift up phenomenon when the angle of the monitor is adjusted.
Figure 3:
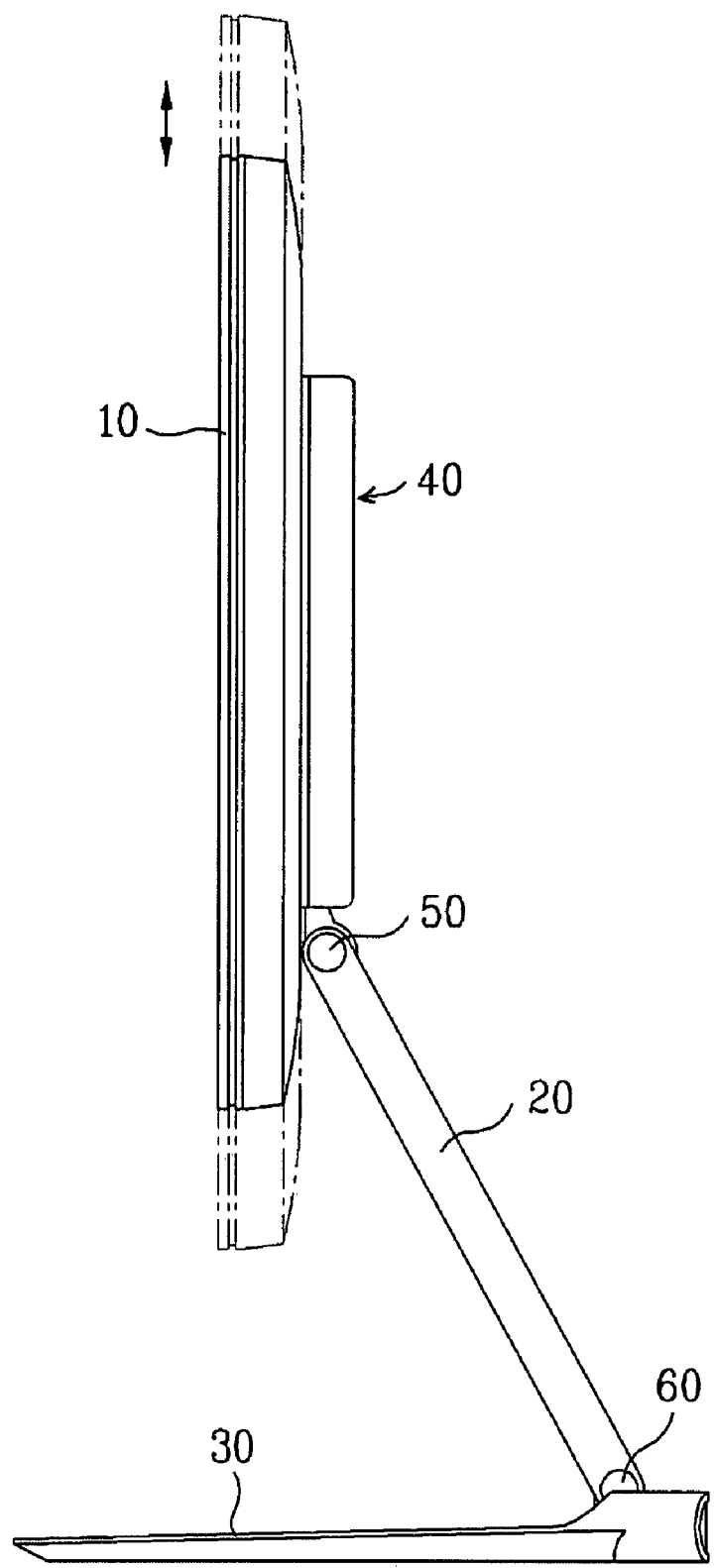
FIG. 3 is a schematic side view of a monitor stand according to an embodiment of the present invention.
Figure 4:
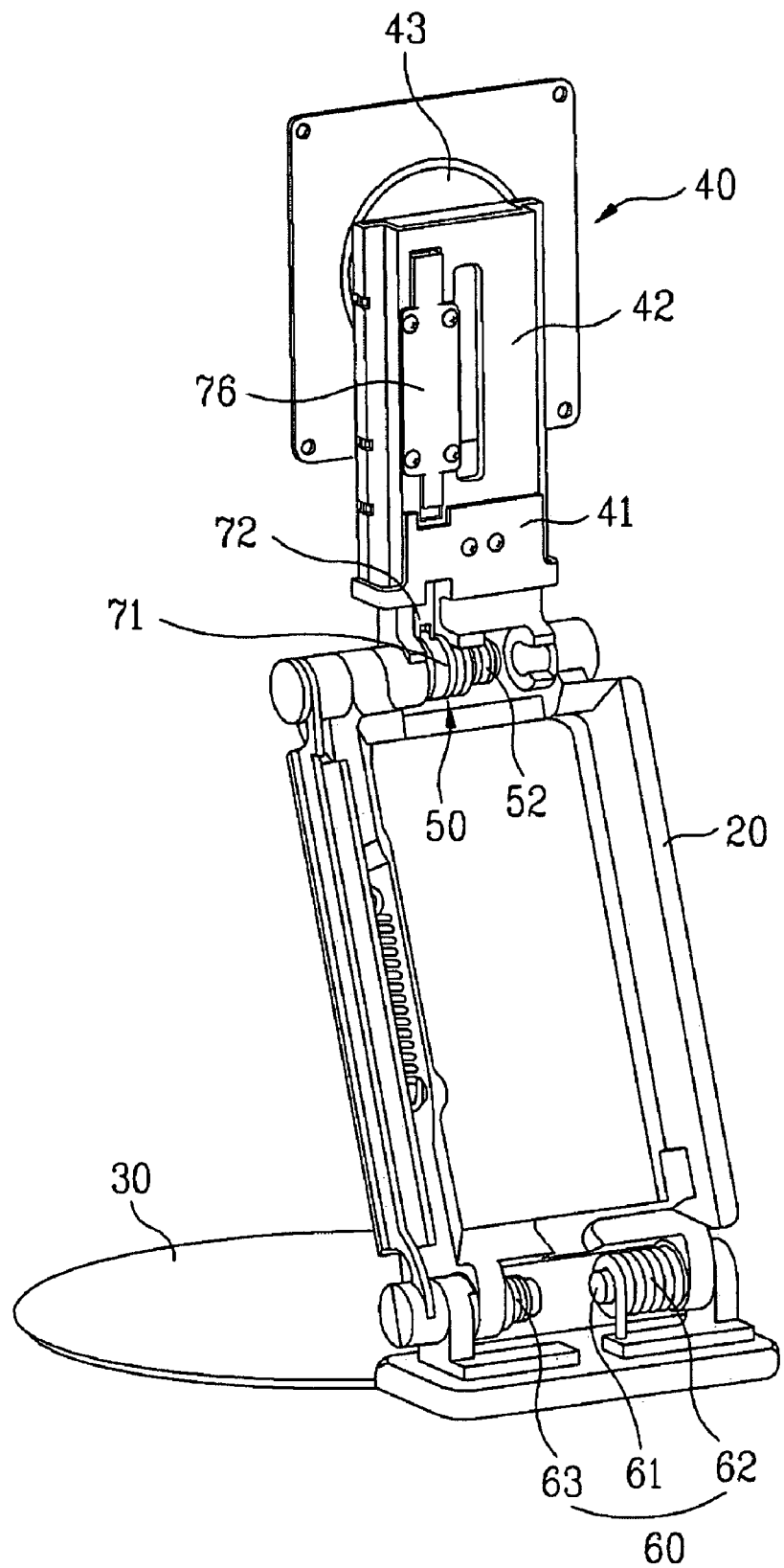
FIG. 4 is a detailed perspective view of a monitor stand according to an embodiment of the present invention.
Figure 5:
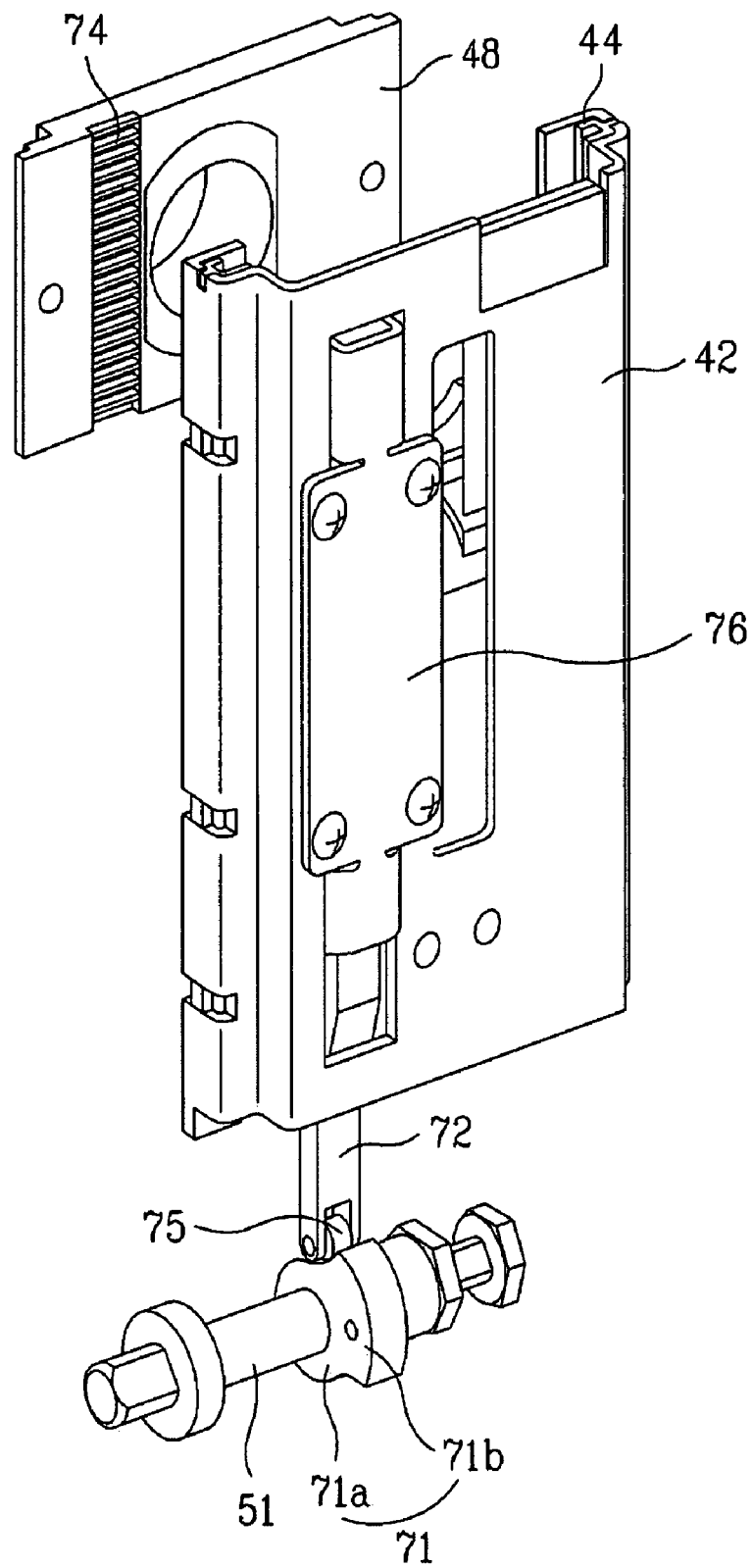
FIG. 5 is a perspective view showing the major components of a stand top assembly and a locking unit of the monitor stand in FIG. 4.

Below, a monitor stand according to preferred embodiments of the present invention will be described with reference to FIGS. 3 through 7. Referring to FIGS. 3 through 5, the monitor stand according to the present invention includes a base 30, a stand body 20, a stand top assembly 40, an upper hinge assembly 50, a top slide 48, a first elastic member 45, and a locking unit.

The stand body 20 pivotably supports the stand top assembly 40, and the stand top assembly 40 slidably supports the top slide 48. The slide body 20 is pivotably supported by a lower hinge assembly 60 that includes a rotating shaft 61 and a torsion spring 62. The elasticity imparted by the torsion spring 62 may maintain the angle of the stand body 20 with respect to a flat surface (on which the monitor stand rests), even when the angle change. Also, a washer 63 may be further provided on the lower hinge assembly 60, if required. The stand body 20 may be permanently fixed to the base 30 so it cannot pivot, and the lower hinge assembly 60 is not a necessary component in the present invention.

When the monitor stand according to the present invention includes the lower hinge assembly 60, the latter forms a dual hinge together with an upper hinge assembly 50.

The lower hinge assembly is similar to the hinge assembly disclosed in Korean Patent Publication No. 2005-0107285 (published Nov. 11, 2005), entitled "Monitor Hinge Assembly", which is hereby incorporated by reference.

Also, the stand top assembly 40, on which a top slide 48 is slidably supported, is pivotably supported on the upper portion of the stand body 20. The stand top assembly 40 according to the present invention is made with a separately manufactured stand top 32 and stand top supporter 35, which are then coupled together; however, the stand top assembly 30 may be formed as a single piece.

The lower portion of the stand top assembly 40, that is, the stand top supporter 41, is pivotably supported by the upper end of the stand body 20 through an upper hinge assembly 50.

The upper hinge assembly 50 includes a rotating shaft 51 for pivotably connecting the stand body 20 to the stand top assembly 40, and a torque generator providing the rotating shaft 51 with a force opposite to the weight of the monitor 10, so that when the stand top assembly 40 on which the monitor 10 is installed is tilted at a predetermined angle, that position can be maintained. The torque generator may be the same as that disclosed in said patent publication entitled "Monitor Stand Assembly", or may be similar in its having a plurality of washers (not shown) and a torsion spring 52.

Figure 6:
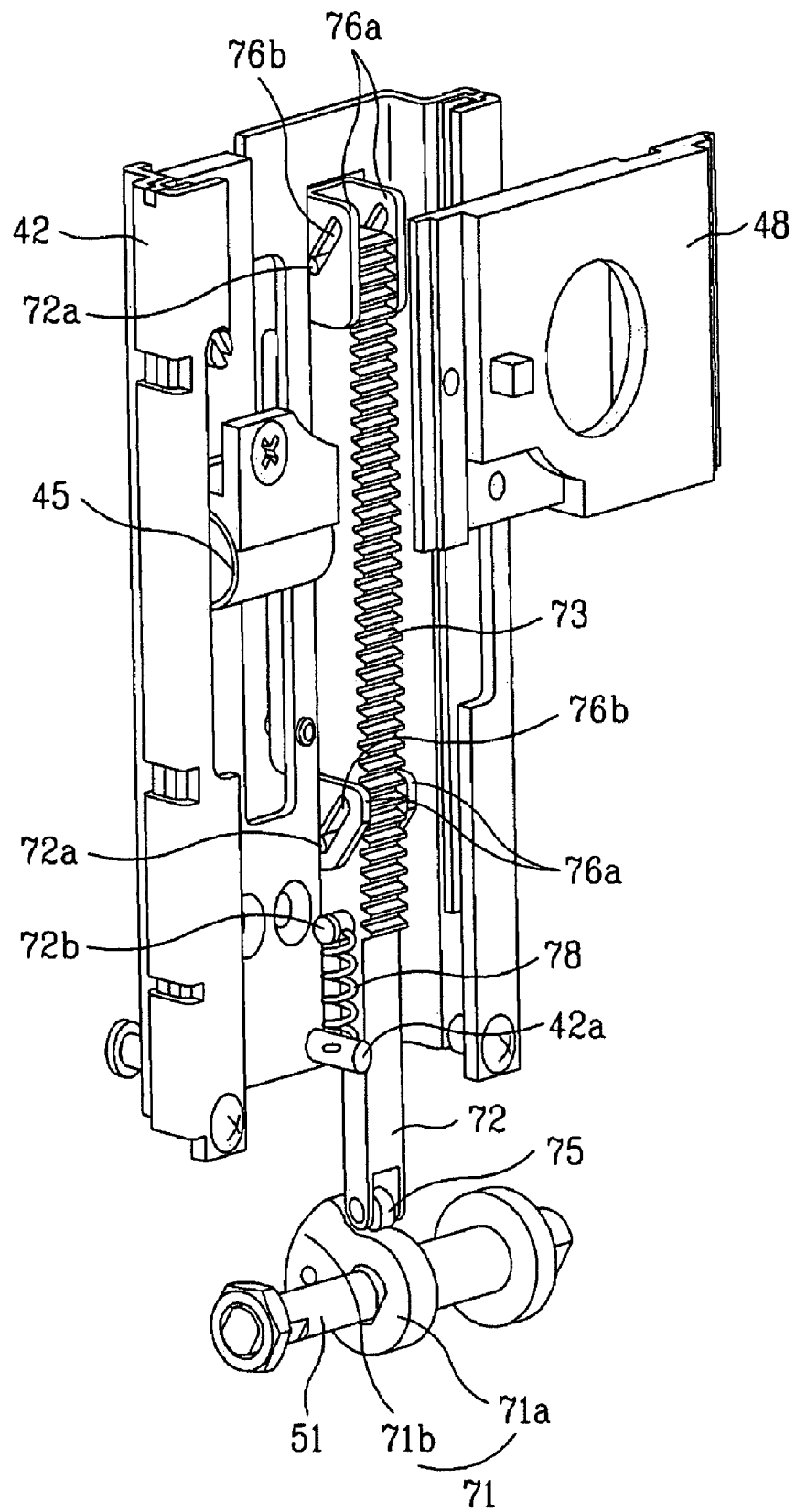
FIG. 6 is a perspective view showing the stand top assembly and the locking unit from the opposite angle to FIG. 5.

Referring to FIGS. 4 through 6, the stand top assembly 40 includes a stand top supporter 41 connected to the rotating shaft 51 of the upper hinge assembly 50, and a stand top 42 coupled to the upper portion of the stand top supporter 41. The top slide 48 is guided along the guide rail 44 of the stand top 42 and supported by the first elastic member 45. The monitor 10 may be directly fixed to the stand top 42, or fixed to the stand top 42 with a separate head mount 43 interposed therebetween, as described in this embodiment.

When a user moves the monitor 10 vertically, the lateral end portions of the top slide 48 move vertically along the guide rail 44 of the stand top 42, allowing the height of the monitor to be adjusted.

The first elastic member 45 has one end fixed to the stand top 42 and the other end fixed to the top slide 48, so that it provides an upward elastic force to the top slide 48. This elastic force equalizes the weight of the monitor 10 to maintain a monitor that has been height-adjusted by a user at its adjusted height. The first elastic member 45 may be a spiral spring 45, as shown in FIG. 6.

In the monitor stand according to the present invention, a locking unit is provided to restrict the top slide 48 and prevent it from sliding with respect to the stand top 42 when a user tilts the monitor backwards past a predetermined angle. A detailed description of the locking unit will now be given.

The locking unit includes a cam 71 fixed to the rotating shaft 51 of the upper hinge assembly 50, a cam follower 72 including a moving rack 73 facing the top slide 48 and the lower end contacting the outer surface of the cam 71, and a fixed rack 74 formed on the top slide 48 facing the moving rack 73 and engaging with or disengaging from the moving rack 73 according to the movement of the cam follower 72.

A cam roller 75 for freely rolling along the outer surface of the cam 71 may be provided on the lower end of the cam follower 72.

A guide pin 72a is formed at a side of the cam roller 72, the guide pin 72a being guided in the slant guide hole 76b formed in the guide rib 76a. In this embodiment, the guide rib 76a is depicted as part of the guide bracket 76 fixed to the stand top 42; however, the configuration thereof is not limited thereto. The guide hole 76b is formed to incline toward the top slide 48 as it goes upward direction.

A second elastic member 78 installed on the side portion of the cam follower 72 applies an elasticity in a lower direction. The second elastic member 78 may be a coil spring with an upper end coupled to a first fixing portion 72b fixed to a side surface of the cam follower 72, and the lower portion is coupled to a second fixing portion 42a fixed at the lower portion of the stand top 42.

The cam 71 includes a base portion 71a having an outer surface that is proximal to the rotating shaft 51, and a protruding portion 71b having an outer surface that is comparatively far from the rotating shaft 51.

Before a description on the operation of the above structured monitor stand according to the present invention is given, a description of the operation for adjusting the height of the monitor 10 will first be provided.

When a user grasps the monitor 10 and applies force in a vertical direction, the top slide 48 moves along the guide rail 44 of the stand top 42 to move vertically. Here, when the user adjusts the monitor 10 to the desired height and lets go, the elasticity of the spiral spring 45 acting against the weight of the monitor 10 and the friction between contacting components enable the monitor 10 to maintain its position.

Figure 7:
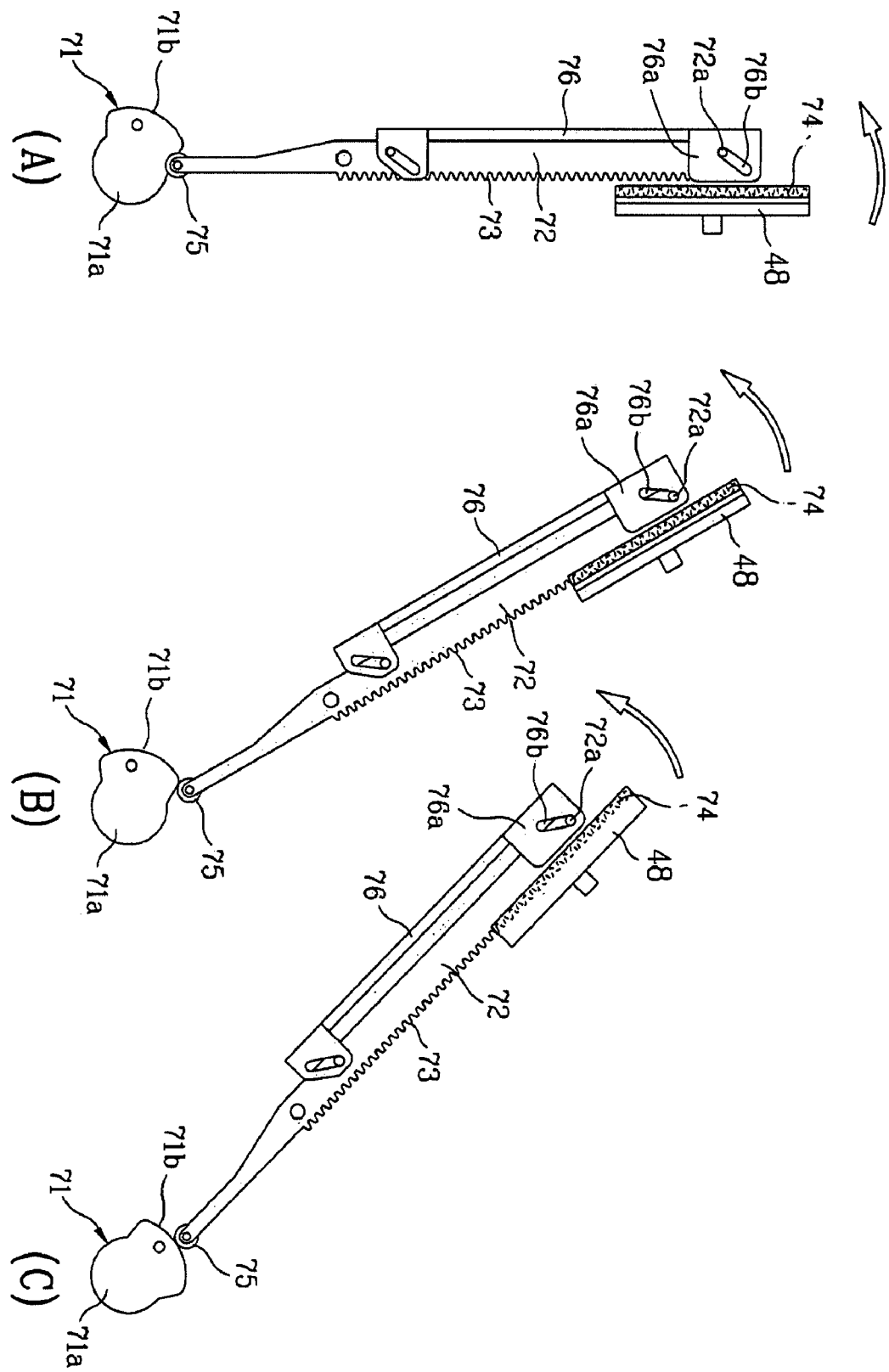
FIG. 7 are schematic side views showing the function of the locking unit according to the present invention.

Next, referring to FIG. 7, a description of the tilt adjusting operation of the monitor 10 will be given.

Referring to FIG. 7A, when the top slide 48 is in a vertical position (and the monitor 10 is vertical), a user grasps the monitor 10 and exerts force rearward against the monitor 10. Then the stand top 42, the guide rib 76a fixed to the stand top 42, and the cam follower 72 supported by the stand top 42 pivot about the rotating shaft 51 in a rearward direction (counterclockwise in FIG. 7B).

Here, the cam roller 75 of the cam follower 72 rolls along the base of the cam 71 from the base portion 71a to the protruding portion 71b.

At the initial stage of the monitor's 10 pivoting, the weight direction change is not big enough for the elasticity of the spiral spring 45 to raise the monitor 10 in a sliding manner upward.

When the stand top 42 is moved from a vertical angle past a predetermined angle (for example, offset 30 degrees from a vertical line), the cam roller 75 of the cam follower 72 mounts the protruding portion 71b of the cam, so that the cam follower 72 rises, and the moving rack 73 engages with the fixed rack 74 of the top slide 48.

When the moving rack 73 engages with the fixed rack 74, even when the difference between the upward elasticity imparted by the first elastic member 45 and the weight W1 vectors of the monitor increases, the top slide 48 is restricted by the cam follower 72, so that the auto lift up phenomenon according to the related art can be obviated.

According to the above-described present invention, when the monitor is pivoted past a predetermined angle, the elasticity from the spiral spring does not induce auto lift up, while the monitor retains the adjusted tilt angle position desired by the user, thereby increasing user satisfaction with the product.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A monitor stand comprising:
a base;
a stand body supported by the base;
a stand top assembly pivotably supported by the stand body;
an upper hinge assembly provided with a rotating shaft, the upper hinge being configured to pivotably connect the stand body to the stand top assembly;
a top slide configured to slide along the stand top assembly and to have a monitor mounted thereon;
a first elastic member supported on the stand top assembly, the first elastic member being configured to impart an upward elasticity to the top slide; and
a locking unit operated automatically when the stand top assembly is pivoted, being configured to restrict a sliding of the top slide with respect to the stand top assembly when the stand top assembly is pivoted from a vertical position to beyond a predetermined angle,
wherein the top slide is configured to slidably move in a vertical direction with respect to the base, and
wherein the locking unit includes a cam fixed to the rotating shaft, a cam follower contacting the cam at a lower portion thereof and capable of moving vertically according to a rotation of the cam, and guided nearer to or farther from the top slide according to the vertical movement, the cam follower including a moving rack formed facing the top slide, and a fixed rack formed on the top slide facing the moving rack, the fixed rack being configured to cease to rise when engaged to the moving rack.

2. The monitor stand according to claim 1, wherein the stand top assembly comprises:
a stand top of which lateral ends are provided as a guide rail; and
a stand top supporter pivotably supported by the stand body, the stand top supporter configured to support the stand top.

3. The monitor stand according to claim 1, wherein the cam follower includes a guide pin protruding in a side direction, and the stand top includes a guide rib fixed thereon, the guide rib having a slant guide hole which guides the guide pin to move closer to the top slide configured to engage the moving rack to the fixed rack when it rises.

4. The monitor stand according to claim 3, further comprising a second elastic member configured to impart elasticity to the cam follower toward the cam.

5. The monitor stand according to claim 1, wherein the cam follower comprises a cam roller installed at a bottom end thereof capable of rotating freely, configured to roll along the cam.

6. The monitor stand according to claim 1, wherein the first elastic member is a spiral spring that winds and unwinds according to a position of the top slide.

7. The monitor stand according to claim 4, wherein the second elastic member is a coil spring with one end fixed to the cam follower and the other end fixed to the stand top, the second elastic member installed in an extended state.

8. The monitor stand according to claim 1, further comprising a lower hinge assembly configured to pivotably connect the stand body to the base.

9. The monitor stand according to claim 8, wherein the monitor is installed to the top slide with a head mount interposed therebetween.

10. A monitor stand comprising:
a base;
a stand body supported by the base;
a stand top assembly pivotably supported by the stand body;
an upper hinge assembly provided with a rotating shaft, the upper hinge being configured to pivotably connect the stand body to the stand top assembly;
a top slide configured to slide along the stand top assembly and connected to a monitor; and
a coupling member movably connected to the stand top assembly and selectively engaged with the top slide,
a cam fixed to the rotating shaft, wherein the coupling member contacts the cam and is capable of moving according to a rotation of the cam,
wherein the coupling member includes a moving rack formed facing the top slide, and the top slide includes a fixed rack selectively engaged with the moving rack and formed facing the moving rack, and
wherein the coupling member is spaced apart from the top slide when the stand top assembly is pivoted from a vertical position within a predetermined angle, and the coupling member is engaged with the top slide when the stand top assembly is pivoted from a vertical position beyond a predetermined angle.

11. The monitor according to claim 10, further comprising a first elastic member supported on the stand top assembly, the first elastic member being configured to impart an upward elasticity to the top slide; and
a second elastic member configured to impart elasticity to the coupling member toward the cam.

12. The monitor according to claim 11, wherein the first elastic member has one end fixed to the top assembly and the other end fixed to the top slide.

13. A monitor stand comprising:
a base;
a stand body supported by the base;
a stand top assembly pivotably supported by the stand body;
an upper hinge assembly provided with a rotating shaft, the upper hinge configured to pivotably connect the stand body to the stand top assembly;
a top slide configured to slide along the stand top assembly and to have a monitor mounted thereon; and
a locking unit operated automatically when the stand top assembly is pivoted, being configured to allow a sliding of the top slide with respect to the stand top assembly when the stand top assembly is pivoted from a vertical position within a predetermined angle and to restrict a sliding of the top slide with respect to the stand top assembly, when the stand top assembly is pivoted from a vertical position to beyond a predetermined angle,
wherein the locking unit includes a cam fixed to the rotating shaft, a cam follower contacting the cam at a lower portion thereof and capable of moving vertically according to a rotation of the cam, the cam follower including a moving rack formed facing the top slide, and a fixed rack formed on the top slide facing the moving rack, the fixed rack being configured to cease to rise when engaged to the moving rack.

14. The monitor according to claim 13, wherein the cam follower is movably coupled to the stand top assembly.

15. The monitor according to claim 13, further comprising an elastic member configured to impart elasticity to the cam follower.

* * * * *